US 7,924,516 B2

(12) United States Patent  (10) Patent No.: US 7,924,516 B2
Marquette  (45) Date of Patent: Apr. 12, 2011

(54) REFLECTIVE FOG FILTER AND METHOD

(76) Inventor: Mark Marquette, Clermont, FL (US)

( * ) Notice: Subject to any disclaimer, the term of this patent is extended or adjusted under 35 U.S.C. 154(b) by 0 days.

(21) Appl. No.: 12/462,013

(22) Filed: Jul. 27, 2009

(65) Prior Publication Data
US 2010/0033859 A1 Feb. 11, 2010

Related U.S. Application Data

(60) Provisional application No. 61/135,968, filed on Jul. 25, 2008.

(51) Int. Cl.
G02B 5/24 (2006.01)
B60J 3/00 (2006.01)
B62D 25/14 (2006.01)

(52) U.S. Cl. ......... 359/885; 296/97.2; 296/97.7; 296/70

(58) Field of Classification Search .................. 359/601, 359/603, 885; 296/70, 84.1, 93, 96.19, 97.2, 296/97.1, 97, 7
See application file for complete search history.

(56) References Cited

U.S. PATENT DOCUMENTS

| | | |
|---|---|---|
| 3,679,255 A | 7/1972 | Nacarato |
| 3,754,135 A | 8/1973 | Hulbert, Jr. |
| 3,837,703 A | 9/1974 | Holladay |
| 4,635,995 A | 1/1987 | Mineck |
| 4,756,603 A | 7/1988 | Ohtani |
| 5,316,359 A * | 5/1994 | Lansinger ............... 296/70 |
| 5,335,099 A | 8/1994 | Smith |
| 5,613,724 A | 3/1997 | Alula |
| 5,848,840 A | 12/1998 | Smith |
| 6,056,397 A | 5/2000 | Berlad |
| 6,299,231 B1 * | 10/2001 | Reitz ................... 296/97.7 |
| 6,746,126 B2 | 6/2004 | Scherber et al. |
| 7,100,960 B2 | 9/2006 | Iwao et al. |
| 7,133,206 B2 | 11/2006 | Shibukawa et al. |
| 7,309,096 B2 | 12/2007 | Iwao et al. |
| 7,471,358 B2 | 12/2008 | Tago et al. |
| 2007/0216836 A1 | 9/2007 | Lippey |
| 2007/0217010 A1 | 9/2007 | Lippey |
| 2009/0116098 A1 | 5/2009 | Chang |

* cited by examiner

Primary Examiner — Audrey Y Chang
(74) Attorney, Agent, or Firm — Massinger Law Offices

(57) ABSTRACT

A reflective fog filter is comprised of a substantially flat white substrate upon which a translucent color filter is applied. A preferred embodiment comprises a blue translucent acetate filter applied to a bright white metallic substrate. The subject apparatus is placed on the dashboard and/or cowl of a motor vehicle with the filter side up. Ambient light striking the apparatus is filtered and reflected onto the windshield directly in the driver's field of view. The apparatus therefore uses ambient light to project a filter onto the windshield. Visibility of objects in fog and other conditions that scatter light is enhanced when light reflecting from the objects is viewed through that portion of the windshield onto which the filter is reflected.

4 Claims, 3 Drawing Sheets

REFLECTIVE FOG FILTER AND METHOD

RELATED APPLICATION

This application claims the benefit of U.S. Provisional Application No. 61/135,968, filed Jul. 25, 2008 and entitled, Reflective Fog Filter and Method.

FIELD OF THE INVENTION

The subject invention relates in general to visibility enhancement devices for use in vehicles having a windshield and dashboard, and more particularly to dashboard mounted reflective filters for improving visibility in fog and rain.

BACKGROUND OF THE INVENTION

Fog and rain are dangerous conditions in which to drive and often produce accidents because drivers cannot see as far ahead and because both conditions adversely affects the driver's ability to properly judge speed and distance; they affect perception. The effects are the result of reduced contrast. People see objects, not based on their absolute brightness or darkness, but on their perception of the difference between the object's brightness and that of its background. Fog and rain lower contrast considerably, causing objects to appear fainter and less distinct to the observer.

Fog forms when water vapor in the air at the surface begins to condense into liquid water. Fog formation requires all of the elements that normal cloud formation requires with the most important being condensation nuclei. When the air is saturated, additional moisture tends to condense rather than staying in the air as vapor. Condensation nuclei must be present in the form of dust, aerosols, pollutants, etc. around which water condenses forming tiny droplets we see as fog.

As light travels through the air, it is affected by these moisture droplets and other objects in its path. Atoms and molecules in the air, including anything carried in the air like dust, smoke and water, will cause light to "scatter". Scattering is the angular redistribution of a portion of an incident light beam when it strikes a rough surface or a cloud of small particles, like fog. Put another way, when light strikes the moisture droplets, only a portion passes through while the rest scatters. Fog and rain therefore block some of the light reflected by objects and less reaches the driver's eye. Water droplets scatter light extremely well, especially when they are small as is the case with fog.

When we drive, the light falling on objects around us, such as the road, other cars, pedestrians, traffic control devices, etc. is reflected to us as the viewer. If there is little or no scattering of light, the images we see are clear and highly contrasted with the background. In fog and rain conditions, the light falling on these objects and reflected to us is scattered before it reaches us. In many instances, the scattered light produced by fog and rain reduces visibility to only a few meters or so creating an incredibly dangerous condition.

Heretofore, a variety of apparatus have been developed to improve visibility of objects in fog and rain conditions. Fog light technology and windshield wipers can lend some relief to the driver's obstructed view; however, both can be very limited in application. More high-tech means of "seeing through fog" using thermal imaging, infrared, sonar or even GPS technologies have also been developed but are not within financial reach of everyday consumers.

The following U.S. utility patents and pending applications relate to windshield modification or the reflecting of light or glare at the windshield: 20090116098 dated May, 2009 entitled, Device for Adjusting the Tint of Glass; U.S. Pat. No. 7,309,096 dated December, 2007 entitled, Visibility Adjusting Method and Apparatus of Vehicle; U.S. Pat. No. 7,133,206 dated November, 2006 entitled, Reflecting Surface Material; U.S. Pat. No. 7,100,960 dated September, 2006 entitled, Visibility Adjusting Method and Apparatus of Vehicle; U.S. Pat. No. 6,746,126 dated June, 2004 entitled, Vehicle Interior Trim Having a Reduced Glare Effect at the Windshield and the Rear View Window; U.S. Pat. No. 6,056,397 dated May, 2000 entitled, Method and Apparatus for Reducing Glare While Driving; U.S. Pat. No. 5,335,099 dated August, 1994 entitled, Veiling Glare Control Holographic Windshield; U.S. Pat. No. 5,316,359 dated May, 1994 entitled, Anti-Reflective Automotive Interior Instrument Panel Surface; U.S. Pat. No. 4,756,603 dated July, 1988 entitled, Glare Proof Transparent Cover Plate; and U.S. Pat. No. 3,679,887 dated July, 1972 entitled, Light Reflection Preventive Device.

A next group of patents relating to glare shields and related attachments for visors are as follows: U.S. Pat. No. 5,613,725 dated March, 1997 entitled, Glare Shield Device; U.S. Pat. No. 5,613,724 dated March, 1997 entitled, Glare Reduction Visor for Vehicles; U.S. Pat. No. 4,635,995 dated January, 1987 entitled Detachably Mounted Add On Sun Visor for Vehicles; U.S. Pat. No. 3,837,703 dated September, 1974 entitled, Glare Shields and U.S. Pat. No. 3,697,255 dated July, 1972 entitled, Mounting Means for Windshield Light Filter.

Finally, the following patents and patent applications relate to filter, lens cover and reflector technology, but do not pertain to windshield-based apparatus or methods as does the subject invention: U.S. Pat. No. 7,471,358 dated December, 2008 entitled, Liquid Crystal Display Device; 20070217010 dated September, 2007 entitled, Reducing Reflection; 20070216836 dated September, 2007 entitled, Reducing Reflection; U.S. Pat. No. 6,299,231 dated October, 2001 entitled, Veiling Glare Reduction System; U.S. Pat. No. 5,848,840 dated December, 1998 entitled, Emergency Fog Lens Device; and U.S. Pat. No. 3,754,135 dated August, 1973 entitled, Light Treating Means.

Most of the above identified patents related to methods and apparatus for reducing or eliminating the reflection of light onto a windshield (i.e., glare). The invention herein is intended to do the opposite, that is, to impart a reflection of specific character onto a portion of the windshield through which said reflection objects in fog may be seen with greater clarity and contrast.

All patents, patent applications, provisional applications, and publications referred to or cited herein, or from which a claim for benefit of priority has been made, are incorporated herein by reference in their entirety to the extent they are not inconsistent with the explicit teachings of this specification.

SUMMARY OF THE INVENTION

The invention described herein improves visibility through fog, rain, smoke and the like by filtering out a certain portion of scattered light observable by occupants of vehicles equipped with a windshield, particularly the driver. The result is an enhanced ability to see through fog and rain and thus lend to safer driving thereby reducing or perhaps eliminating the danger of an accident.

As an apparatus, the subject reflective fog filter of the subject invention is comprised of a substantially flat white substrate upon which a translucent blue filter is applied. The white substrate can comprise wood, polymeric material or metal. The translucent blue filter material can comprise gel filter material, acetate or the like. A preferred embodiment comprises a blue translucent acetate filter applied to a bright white metallic substrate. The reflective fog filter may further include a frame about its periphery to aid in maintaining the blue translucent filter on the substrate, protect the edges thereof from damage, enhance the aesthetic value of the filter and most importantly provide a visible border around the improved area of visibility when reflected onto a windshield as described herein.

In operation, the subject filter is placed on the dashboard and/or cowl of the vehicle with the filter side up. Ambient light striking the apparatus is filtered and reflected onto the windshield directly in the driver's field of view. The apparatus therefore uses ambient light to project a filter onto the windshield. Applicant has discovered that visibility of objects in fog is enhanced when viewed through that portion of the windshield on which the filter is reflecting.

The filter can be removably affixed to the dashboard with a securing means such as, for example, tape, Velcro, friction tape and the like to maintain the position of the filter on the dash board. Alternatively, the apparatus may be built into the dashboard itself and provided with a cover to prevent reflection when not in use.

There has thus been outlined, rather broadly, the more important components and features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is, therefore, a primary object of the subject invention to provide means for improving visibility of objects in conditions of fog, rain, smoke and the like by occupants of vehicles equipped with a windshield and dashboard, particularly the driver.

It is another primary object of the subject invention to improve visibility of objects in conditions of fog, rain, smoke and the like by using ambient light within a vehicle to reflect a light filter onto an area of the vehicle's windshield, which said light filter causes light from reflected objects outside the vehicle to be seen with enhanced clarity and contrast.

Another object of the subject invention is to provide a reflective fog filter that is fabricated from materials that may be finished to possess a smooth, easily cleanable surface.

Another object of the subject invention is to provide a reflective fog filter that is relatively simple in design and therefore capable of rapid construction at relatively low costs.

These together with other objects of the invention, along with the various features of novelty which characterize the invention, are pointed out with particularity in the claims annexed to and forming a part of this disclosure. For a better understanding of the invention, its advantages and the specific objects attained by its uses, reference should be had to the accompanying drawings and descriptive matter in which there is illustrated a preferred embodiment of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENT

Figure 1:
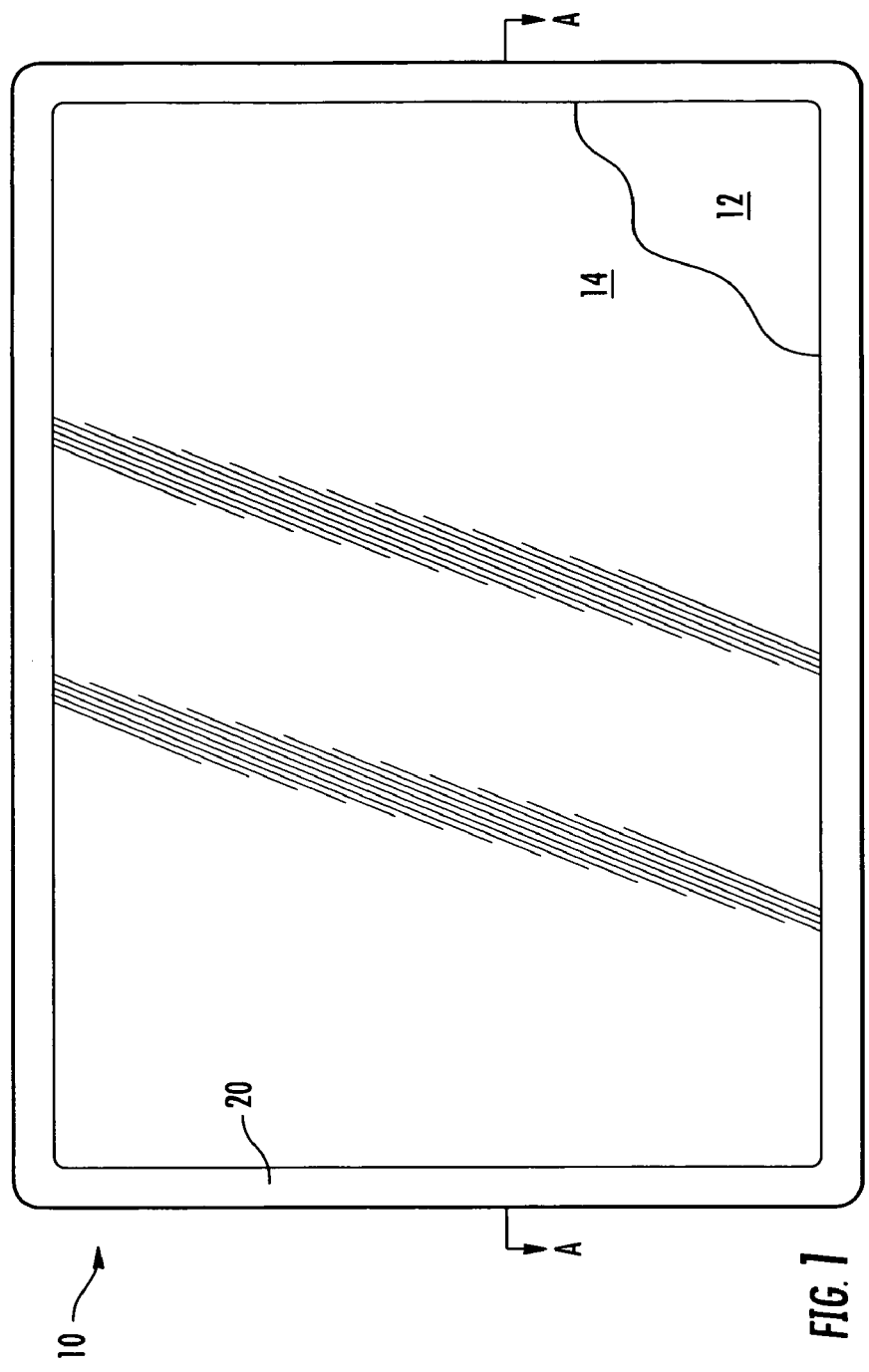
FIG. 1 is a plan view of the subject reflecting fog filter wherein a portion of the filter layer is shown in cutaway view to reveal the underlying substrate.
Figure 2:
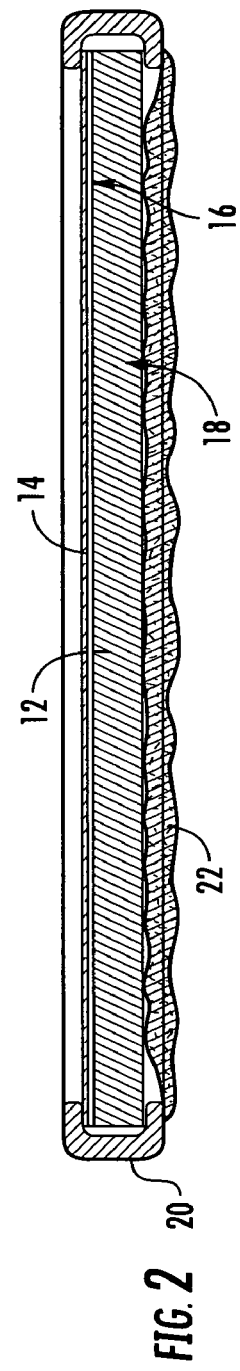
FIG. 2 is a cross-sectional view taken of the invention of FIG. 1 taken along lines A-A.

Reference is now made to FIGS. 1 and 2 in which there is illustrated plan and cross-sectional views, respectively, of an exemplary reflective fog filter according to aspects of the present invention, designated generally by reference numeral 10. Reflective fog filter apparatus 10 has two primary components, namely an opaque substrate 12 and an overlying translucent color filter 14.

Substrate 12 is substantially 2-dimensional having a top surface 16 and bottom surface 18 and is comprised of wood, polymeric material or metal and should be rigid or semi-rigid in construction. Top surface 16 is smooth in appearance and texture. In a preferred embodiment, substrate 12 is bright white in color, but in any event shall be capable of reflecting light.

Color filter 14, sometimes referred to as a color gel, is a transparent colored material comprised of a sheet of acetate or acetate-based material or alternatively of polycarbonate or polyester material the latter pair of which possess superior heat tolerance by comparison. Color filter 14 may also be combinations of these materials. In all cases, color filter 14 is colored to permit the transmission of some light while absorbing others (i.e., preventing their transmission either partly or entirely. Specifically, experimentation conducted by applicant has revealed that blue colored filters, that is filters permitting the transmission of light having a wavelength of approximately 475 nm+/−25 nm while blocking other visible light work best for the intended application herein described. The interface between color filter 14 top surface 16 of substrate 14 should be smooth and continuous and free of air pockets. An adhesive may be used between the edges of these two layers to bond them together.

Reflecting fog filter 12 may further include at least two other optional components. First a frame 20 may be mounted around the periphery of color filter 14 and substrate 12. Frame 20 may be constructed of plastic or other suitable material and is preferably but not essentially bright white in color. Frame 20 aids in maintaining the connection between color filter 14 and substrate 14, protects the edges of these components from damage, enhances the aesthetic value of the apparatus generally, and most importantly, when reflected onto a windshield provides a visible border 24 (FIG. 4) around the area of improved visibility.

A second optional component is backing material 22 which may be affixed to the bottom surface 18 of substrate 12 and/or the bottom surface of frame 20. Backing material 22 may be constructed of any material that imparts slip-resistance to apparatus 10 when placed on a vehicle dashboard as described below. Backing material 22 may further protect vehicle surfaces from scratching that may otherwise be caused by the subject apparatus.

Figure 3:
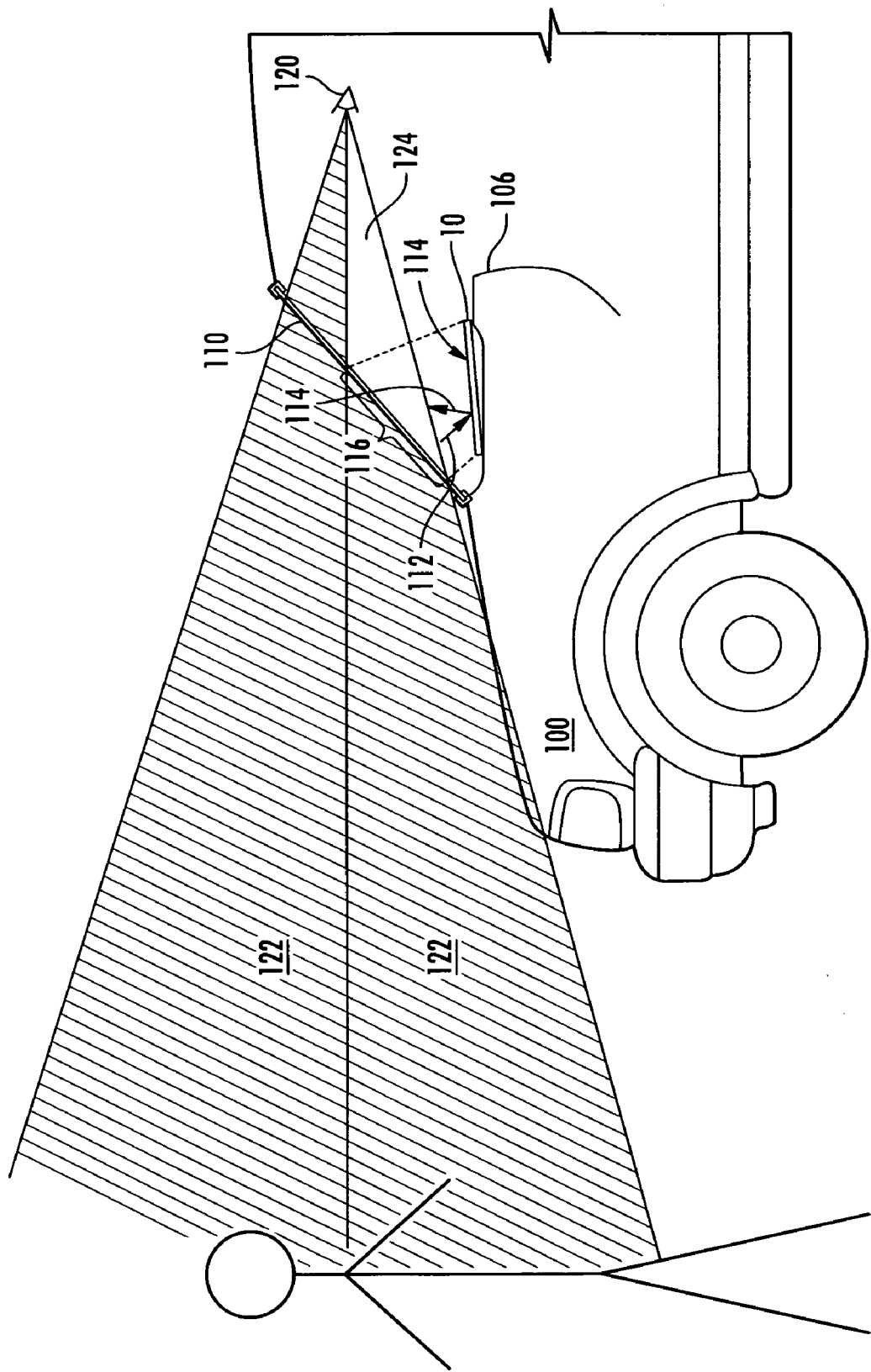
FIG. 3 is schematic side view of the apparatus employed in a vehicle.
Figure 4:
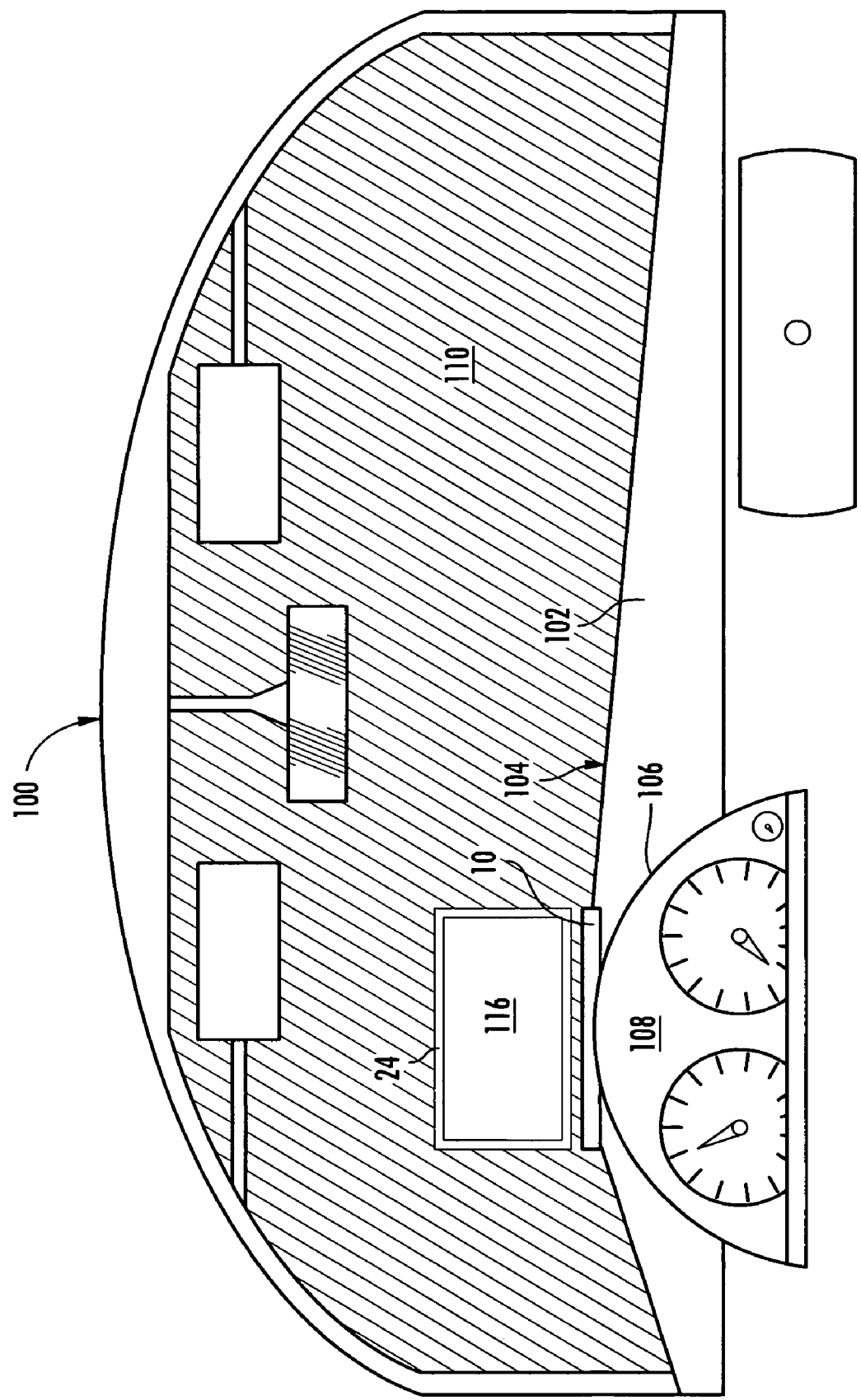
FIG. 4 is a schematic view of the apparatus in operation as seen by a viewer inside a vehicle.

Referring now to FIGS. 3 and 4, in operation, the subject reflective fog filter 10 is employed in the driver/passenger compartment of a vehicle 100 having a dashboard 102 having a substantially horizontal shelf portion 104, a cowl structure 106 which houses an instrument panel 108, and a windshield 110 inclined upwardly and rearward from dashboard 102 (i.e., extending over at least a portion of dashboard 102 at an angle relative to shelf portion 104).

Reflecting fog filter 10 is placed on shelf portion 104 of dashboard 102 in front of (or partially on top of) cowl structure 106 such that color filter 114 is facing up. When ambient light 112 strikes reflecting fog filter 10, it passes through color filter 14, reflects off substrate 12 in the form of filtered light 114 and onto an area 116 of windshield 110 directly in the driver's field of view. The apparatus therefore uses ambient light to project a reflected filter onto the windshield. Applicant has discovered that visibility of objects 118 in fog and other conditions causing scattering of light reflected from said objects is enhanced when viewed by an observer 120 through that portion of the windshield onto which light from the filter is reflected, namely area 116. Scattered light represented by shaded areas 122 in FIGS. 3 and 4 will, by its very nature, lack clarity and contrast when viewed by observer 120. However, scattered light passing through the reflection of reflecting fog filter 10 on windshield 110 is filtered as represented by area 116 of FIG. 3 and the non-shaded triangular shaped area 124 depicted in FIG. 4 thereby enhancing visibility of objects normally obscured by fog and other light scattering conditions.

The subject reflecting fog filter 10 can be removably affixed to dashboard 102 with a securing means such as, for example, friction tape, hook and loop tape and the like to maintain the position of the filter on the dash board. Alternatively, the apparatus may be built into the dashboard itself and provided with a cover to prevent reflection when not in use.

It should be noted that reflective fog filter 10 can be used to enhance vision in fog, smoke, rain and other atmospheric conditions that cause scattering of light reflected from objects in the operator's field of view. The reflective fog filter should not be utilized on sunny days or under any other conditions wherein the reflection created by the filter impedes vision.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

What is claimed as being new, useful and desired to be protected by Letters Patent of the United States is as follows:

1. In a motor vehicle having a dashboard with a substantially horizontal surface, and a windshield inclined upwardly and rearward from the dashboard, the improvement comprising:
   a. a substantially planar substrate having a light reflecting surface; said substrate being mounted on the substantially horizontal surface of the dashboard in front of the operator of the motor vehicle; and
   b. a color filter applied to said light reflecting surface of said substrate; said color filter and said substrate being reflected onto an area of the windshield;
   whereby objects viewed through the area of the windshield upon which said color filter and said substrate are reflected appear with greater clarity.

2. The improvement of claim 1 wherein said substrate is white.

3. The improvement of claim 2 wherein said color filter is blue.

4. The improvement of claim 1 wherein said color filter is blue.

* * * * *